US011087580B2

(12) United States Patent
Anand et al.

(10) Patent No.: US 11,087,580 B2
(45) Date of Patent: Aug. 10, 2021

(54) SYSTEMS AND METHODS FOR SECURING CONTACTLESS CARDS FROM UNAUTHORIZED PAYMENTS

(71) Applicant: JPMorgan Chase Bank, N.A., New York, NY (US)

(72) Inventors: Himanshu Anand, London (GB); Scott H. Ouellette, Kingston, NH (US)

(73) Assignee: JPMorgan Chase Bank, N.A., New York, NY (US)

( * ) Notice: Subject to any disclaimer, the term of this patent is extended or adjusted under 35 U.S.C. 154(b) by 0 days.

(21) Appl. No.: 16/716,656

(22) Filed: Dec. 17, 2019

(65) Prior Publication Data
US 2020/0193757 A1 Jun. 18, 2020

Related U.S. Application Data (60) Provisional application No. 62/780,491, filed on Dec. 17, 2018.

(51) Int. Cl.
| | |
|---|---|
| *G07F 7/10* | (2006.01) |
| *G06Q 20/34* | (2012.01) |
| *G06Q 20/40* | (2012.01) |
| *G06Q 20/10* | (2012.01) |

(52) U.S. Cl.
CPC .......... *G07F 7/1008* (2013.01); *G06Q 20/34* (2013.01); *G06Q 20/4012* (2013.01); *G06Q 20/10* (2013.01)

(58) Field of Classification Search
CPC ...... G07F 7/1008; G07F 7/0833; G07F 7/122; G07F 7/084; G07F 7/0893; G06Q 20/34; G06Q 20/4012; G06Q 20/10; G06Q 20/352; G06Q 20/3674; G06Q 20/401; G06Q 20/3823
See application file for complete search history.

(56) References Cited

U.S. PATENT DOCUMENTS

| | | | | |
|---|---|---|---|---|
| 7,814,332 | B2 * | 10/2010 | Beenau ................ | G06Q 20/04 |
| | | | | 713/186 |
| 9,245,220 | B2 * | 1/2016 | Olson ................... | G07F 7/0833 |
| 9,286,605 | B2 * | 3/2016 | Kelley ................. | G06Q 20/352 |
| 10,475,025 | B2 * | 11/2019 | Zarakas ............... | G06K 19/045 |
| 10,615,980 | B2 * | 4/2020 | Kamal ................. | G06K 19/10 |
| 2011/0078031 | A1 * | 3/2011 | Mardikar ............. | G06Q 20/202 |
| | | | | 705/17 |
| 2016/0300224 | A1 * | 10/2016 | Liu ...................... | G06K 19/06037 |
| 2017/0330173 | A1 * | 11/2017 | Woo .................... | G06K 19/07354 |

\* cited by examiner

*Primary Examiner* — Seung H Lee
(74) *Attorney, Agent, or Firm* — Hunton Andrews Kurth LLP (57) ABSTRACT

An embodiment of the present invention is directed to systems and methods for securing contactless cards from unauthorized payments, including card cloning attacks. An embodiment of the present invention provides a password at the time of usage of the card to decrypt the data contained in the card at the time when the user is initiating a transaction. In this exemplary illustration, card data may be encrypted at rest, and decrypted at the time of use. Other variations may include a switchable antenna that is disabled at rest and enabled during a transaction.

14 Claims, 6 Drawing Sheets

SYSTEMS AND METHODS FOR SECURING CONTACTLESS CARDS FROM UNAUTHORIZED PAYMENTS

CROSS REFERENCE TO RELATED APPLICATIONS

The application claims priority to U.S. Provisional Application 62/780,491, filed Dec. 17, 2018, the contents of which are incorporated herein in its entirety.

FIELD OF THE INVENTION

The present disclosure generally relates to contactless card security and more specifically to protecting contactless cards against unauthorized payments including card cloning and other attacks.

BACKGROUND OF THE INVENTION

Contactless cards include a chip that enables users to pay over a secure network. Contactless cards may take on various forms, including credit cards, debit cards, stored value cards, etc. Instead of swiping or inserting a card into a point of sale device, the customer simply brings the card in close proximity to an enabled point of sale device, and data is transmitted using near field communication (NFC). For example, a user may tap a contactless card to a card reader to simplify and facilitate transactions.

The data on contactless cards, however, is susceptible to theft. An attacker can steal the data, and can then use it later to make purchases, withdraw cash, etc.

SUMMARY OF THE INVENTION

According to one embodiment, the invention relates to a contactless card that comprises: a memory component that stores card data wherein the card data is encrypted as encrypted card data; an activation mechanism configured to receive an input from a user of the contactless card that decrypts the encrypted card data as decrypted card data using a dynamic password automatically generated; and an antenna that communicates with a point of sale device and transmits the decrypted card data to the point of sale device via a near field communication network for a transaction.

According to another embodiment, the invention relates to a contactless card that comprises: a memory component that stores card data; a switchable antenna that is configured to communicate with a point of sale device upon an activation by a user of the contactless card; and an activation mechanism configured to receive an input from the user of the contactless card that activates the antenna to transmit the card data to the point of sale device via a near field communication network for a transaction.

According to yet another embodiment, a contactless card comprises: a memory component that stores card data wherein the card data is encrypted as encrypted card data; a switchable antenna that communicates with a point of sale device; and an activation mechanism configured to receive an input from a user of the contactless card that decrypts the encrypted card data as decrypted card data using a dynamic password automatically generated and activates the antenna to transmit the decrypted card data to the point of sale device via a near field communication network for a transaction.

The computer implemented system and method described herein provide unique advantages to entities, organizations and other users, according to various embodiments of the invention. An embodiment of the present invention is directed to a financial transaction processing system that provides security and fraud protection for contactless cards. An embodiment of the present invention limits transmission of card data and improves protection of sensitive information. When the user is not conducting a transaction, the data in the card remains encrypted. Accordingly, in the event the card is compromised, the card data remains encrypted and is therefore not accessible. These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION OF PREFERRED EMBODIMENTS

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to systems and methods for securing contactless cards from card cloning attacks. An embodiment of the present invention generates a password (or other key, PIN, etc.) to decrypt the data contained on the card when the user is initiating a transaction. The password may be protected by various encryption algorithms and methodologies.

For example, the password may be a dynamic password that encrypts the data stored on the card. At the time of a transaction, a password may be used to decrypt the data in the card. The data may include the credit card number as well as other card data and/or sensitive information. When the user is not conducting a transaction, the data in the card remains encrypted, so even if the attacker is able to clone the data, without the password, the data is of no use.

Figure 1:
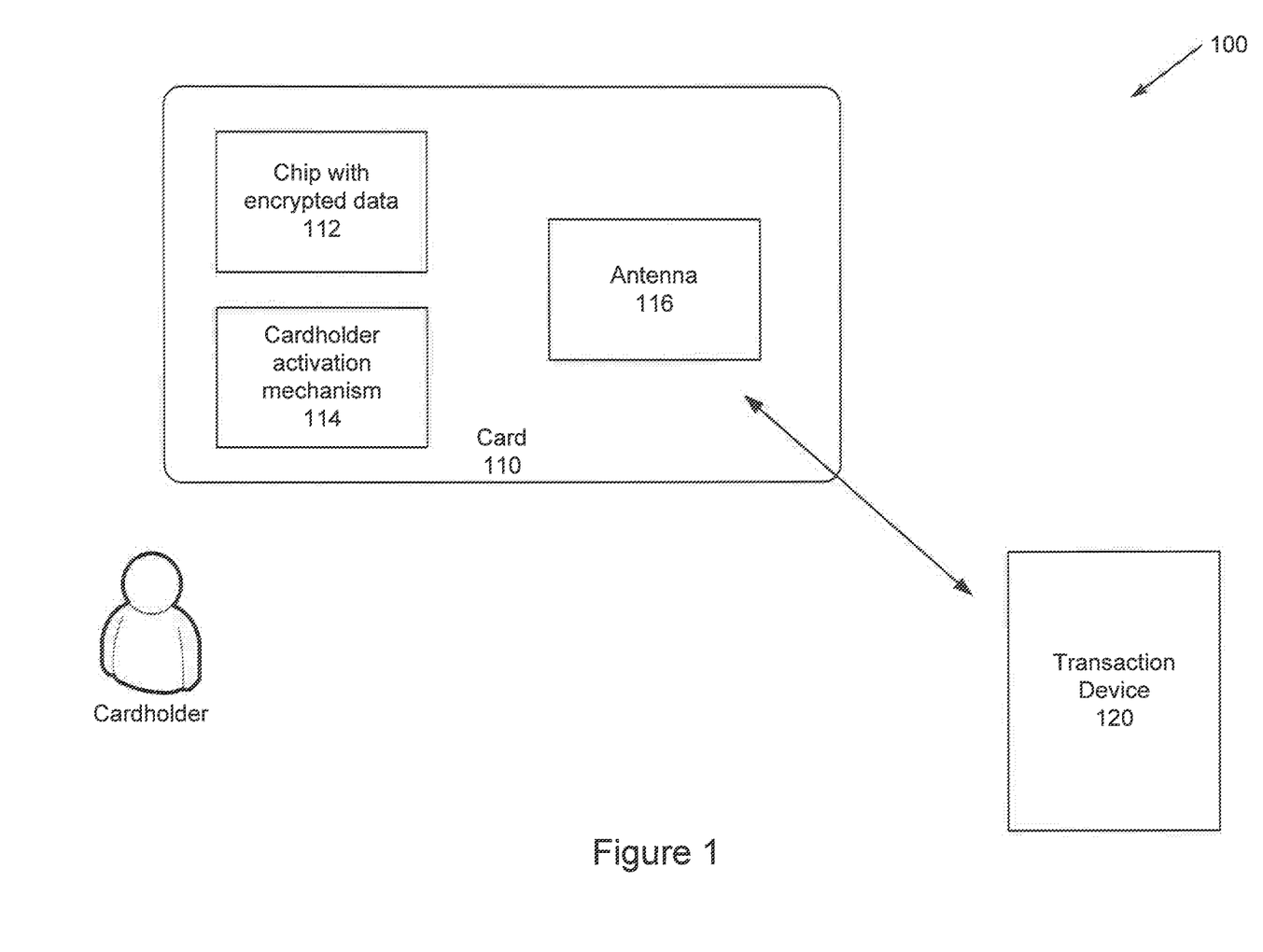
FIG. 1 illustrates an exemplary system for securing contactless cards from card cloning attacks, according to an embodiment of the present invention.

FIG. 1 illustrates an exemplary system for securing contactless cards from card cloning attacks, according to an embodiment of the present invention. In this exemplary illustration, card data may be encrypted at rest, and decrypted at the time of use.

As shown in FIG. 1, System 100 may include card 110, which may be a debit card, credit card, stored value card, etc. Card 110 may include chip 112 that stores encrypted card data, activation mechanism 114, such as a button, switch, biometric reader, etc., which may be used to enable decryption of the card data, and antenna 116, which may communicate the decrypted card data to transaction device 120. The transaction device may represent a point of sale terminal, merchant device, etc. According to an embodiment of the present invention, unless activation mechanism 114 is activated, the data in chip 112 remains encrypted and any attempts to read the card data from chip 112 will result in encrypted data being retrieved.

Figure 2:
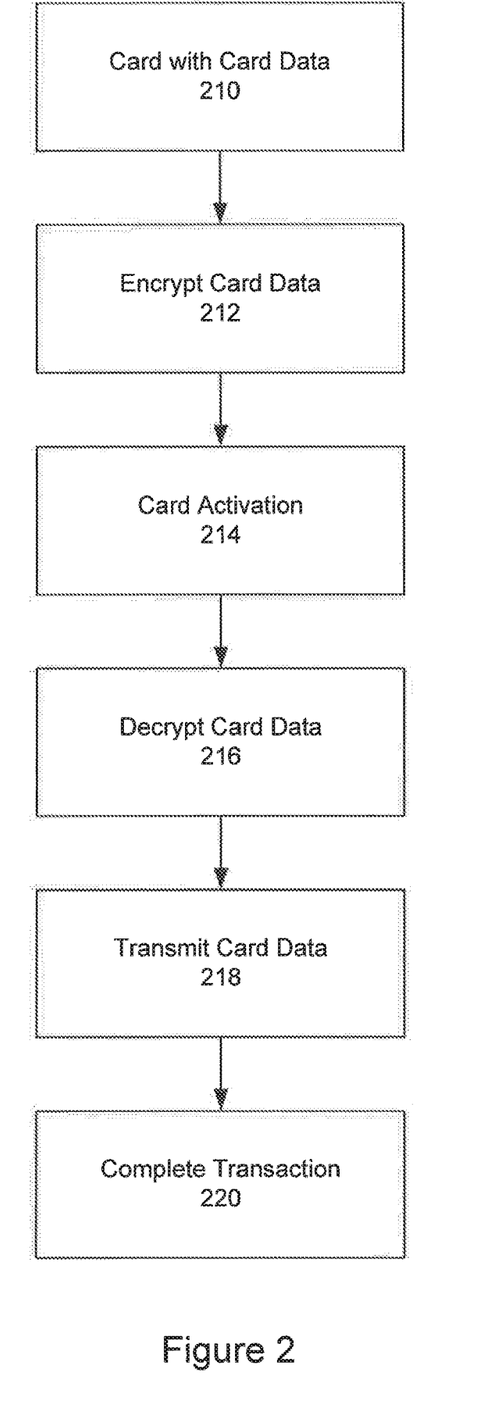
FIG. 2 illustrates an exemplary flowchart for securing contactless cards from card cloning attacks, according to an embodiment of the present invention.

FIG. 2 illustrates an exemplary flowchart for securing contactless cards from card cloning attacks, according to an embodiment of the present invention. At step 210, a card with card data may be provided. The card data may be maintained on a chip and/or other micro-processing component. At step 212, the card data may remain encrypted. At step 214, the card may be activated for a transaction with a point of sale device, merchant or other transaction device. Activation may involve a card user input, e.g., user initiated button, switch, finger print reader or other user initiated or automated activation. At step 216, the card data may be decrypted in response to the card user input. The decryption may be performed by a dynamic password that is generated prior to the transaction. At step 218, the decrypted card data may be transmitted to a point of sale device. The point of sale device may be at a merchant location and include other transaction devices or terminals. For example, the card data may be sent unencrypted via a communication protocol, e.g., a NFC antenna, etc. At step 220, the transaction may be completed. While the process of FIG. 2 illustrates certain steps performed in a particular order, it should be understood that the embodiments of the present invention may be practiced by adding one or more steps to the processes, omitting steps within the processes and/or altering the order in which one or more steps are performed.

Figure 3:
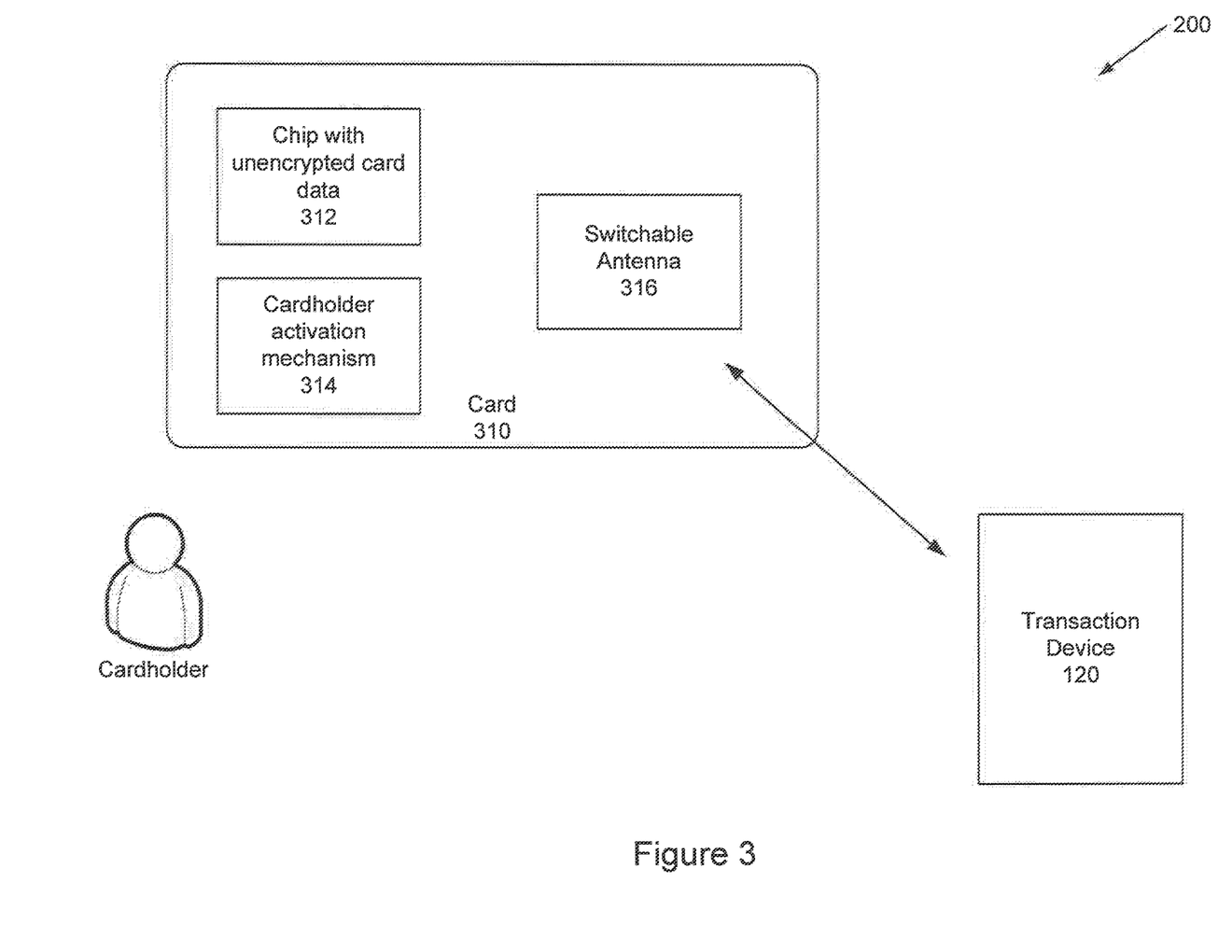
FIG. 3 illustrates an exemplary system for securing contactless cards from card cloning attacks, according to an embodiment of the present invention.

FIG. 3 illustrates an exemplary system for securing contactless cards from card cloning attacks, according to an embodiment of the present invention. In this exemplary illustration, card data may be unencrypted at rest, but the antenna may be inactive and unable to communicate the data until activated by the cardholder.

System 200 may include card 210, which may be a debit card, credit card, stored value card, etc. Card 210 may include chip 112 that stores unencrypted card data, activation mechanism 214, such as a button, switch, biometric reader, etc., which may be used to enable switchable antenna 216, and switchable antenna 216, which may communicate the card data to point of transaction device 220. According to an exemplary embodiment, unless activation mechanism 214 is activated, switchable antenna 214 is inactive and cannot communicate card data to transaction device 120.

According to an embodiment of the present invention, any suitable mechanism for activating antenna 214 may be used as is necessary and/or desired. For example, activation switch 214 may enable switchable antenna 216 to communicate with chip 212 to receive card data.

Figure 4:
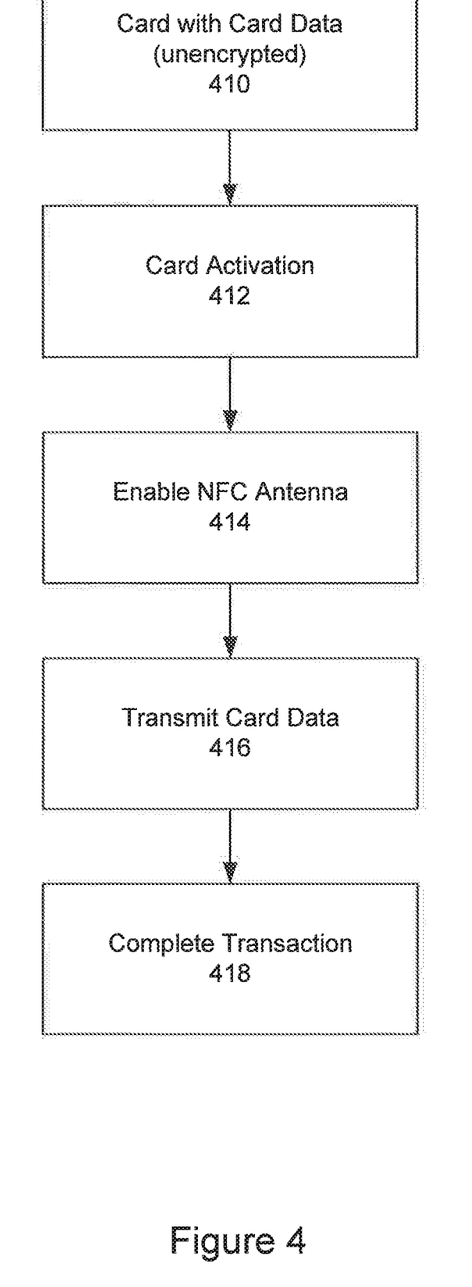
FIG. 4 illustrates an exemplary flowchart for securing contactless cards from card cloning attacks, according to an embodiment of the present invention.

FIG. 4 illustrates an exemplary flowchart for securing contactless cards from card cloning attacks, according to an embodiment of the present invention. At step 410, a card with card data may be provided. The card data may be maintained on a chip and/or other micro-processing component. In this example, the card data is unencrypted at rest. At step 412, the card may be activated for a transaction. This may involve a card user input, e.g., user initiated button, switch, finger print reader or other user initiated or automated activation. At step 414, a switchable antenna may be activated in response to the card user input. At step 416, the card data may be transmitted to a point of sale device via the switchable antenna. The point of sale device may be at a merchant location and include other transaction devices or terminals. For example, the card data may be sent unencrypted via a communication protocol, e.g., a NFC antenna, etc. At step 418, the transaction may be completed. While the process of FIG. 4 illustrates certain steps performed in a particular order, it should be understood that the embodiments of the present invention may be practiced by adding one or more steps to the processes, omitting steps within the processes and/or altering the order in which one or more steps are performed.

Figure 5:
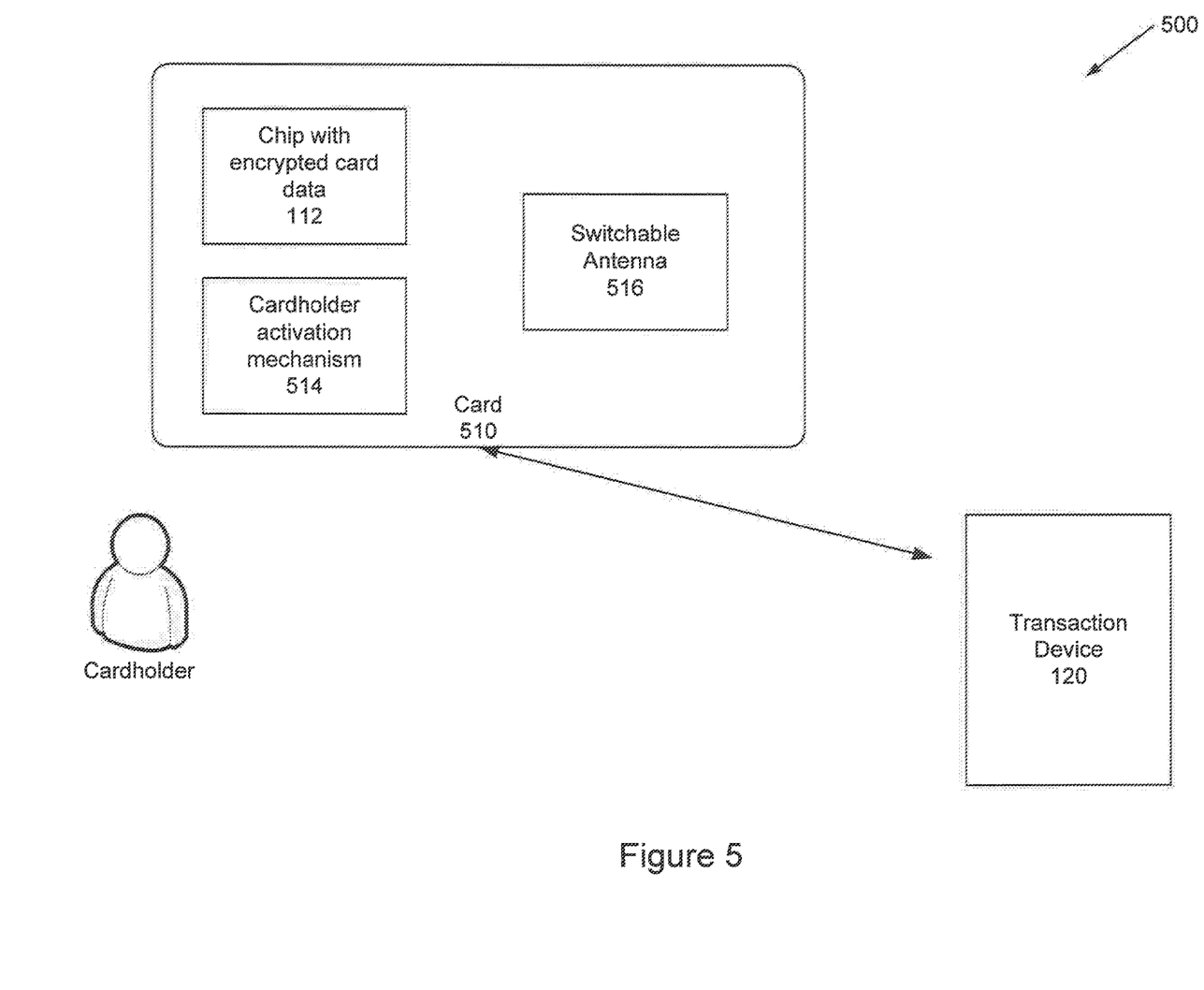
FIG. 5 illustrates an exemplary system for securing contactless cards from card cloning attacks, according to an embodiment of the present invention.

FIG. 5 illustrates an exemplary system for securing contactless cards from card cloning attacks, according to an embodiment of the present invention. This embodiment may combine the embodiments of FIG. 1 and FIG. 3, so that card data is encrypted at rest in chip 112, and activation mechanism 314 both enables decryption of card data and activates switchable antenna 316 so that card data may be communicated to transaction device 120. When activation mechanism 314 is not activated, the card data is encrypted and switchable antenna 316 is inactive.

Figure 6:
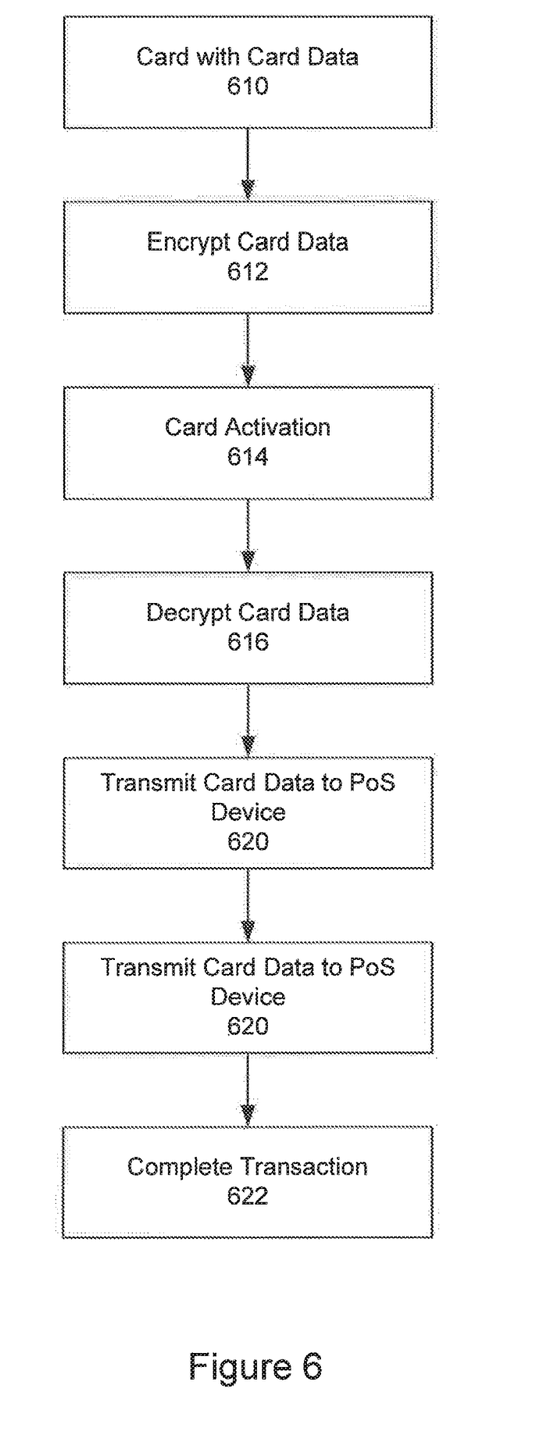
FIG. 6 illustrates an exemplary flowchart for securing contactless cards from card cloning attacks, according to an embodiment of the present invention.

FIG. 6 illustrates an exemplary flowchart for securing contactless cards from card cloning attacks, according to an embodiment of the present invention. At step 610, a card with card data may be provided. The card data may be maintained on a chip and/or other micro-processing component. At step 612, the card data may be encrypted. At step 614, the card may be activated for a transaction. This may involve a card user input, e.g., user initiated button, switch, finger print reader or other user initiated or automated activation. At step 616, the card data may be decrypted in response to the card user input. The decryption may be performed by a dynamic password that is generated. At step 618, a switchable antenna may be activated in response to the card user input. At step 620, the decrypted card data may be transmitted to a point of sale device via the switchable antenna. The point of sale device may be at a merchant location and include other transaction devices or terminals. For example, the card data may be sent unencrypted via a communication protocol, e.g., a NFC antenna, etc. At step 622, the transaction may be completed. While the process of FIG. 6 illustrates certain steps performed in a particular order, it should be understood that the embodiments of the present invention may be practiced by adding one or more steps to the processes, omitting steps within the processes and/or altering the order in which one or more steps are performed.

Although several embodiments have been disclosed, it should be recognized that these embodiments are not exclusive to each other, and certain elements or features from one embodiment may be used with another.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, which enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A contactless card comprising:
   a memory component that stores card data wherein the card data is encrypted as encrypted card data;
   an activation mechanism configured to receive an input from a user of the contactless card that decrypts the encrypted card data as decrypted card data using a dynamic password automatically generated; and
   an antenna that communicates with a point of sale device and transmits the decrypted card data to the point of sale device via a near field communication network for a transaction.

2. The contactless card of claim 1, wherein the input comprises a user-initiated action.

3. The contactless card of claim 1, wherein the card data comprises a card number associated with the contactless card.

4. The contactless card of claim 1, wherein the card data comprises a security code associated with the contactless card.

5. The contactless card of claim 1, wherein the card data is encrypted when the contactless card is at rest.

6. The contactless card of claim 1, wherein the activation mechanism is only activated to receive the input when the contactless card is used to make a transaction.

7. The contactless card of claim 1, wherein the activation mechanism is only activated to receive the input when the contactless card is proximate to the point of sale device.

8. A contactless card comprising:
   a memory component that stores card data wherein the card data is encrypted as encrypted card data;
   a switchable antenna that communicates with a point of sale device; and
   an activation mechanism configured to receive an input from a user of the contactless card that decrypts the encrypted card data as decrypted card data using a dynamic password automatically generated and activates the antenna to transmit the decrypted card data to the point of sale device via a near field communication network for a transaction.

9. The contactless card of claim 8, wherein the antenna is disabled when the contactless card is at rest.

10. The contactless card of claim 8, wherein the input comprises a user-initiated action.

11. The contactless card of claim 8, wherein the card data comprises a card number associated with the contactless card.

12. The contactless card of claim 8, wherein the card data comprises a security code associated with the contactless card.

13. The contactless card of claim 8, wherein the activation mechanism is only activated to receive the input when the contactless card is used to make a transaction.

14. The contactless card of claim 8, wherein the activation mechanism is only activated to receive the input when the contactless card is proximate to the point of sale device.

\* \* \* \* \*